US006623635B2

(12) United States Patent
Barnes

(10) Patent No.: US 6,623,635 B2
(45) Date of Patent: Sep. 23, 2003

(54) ASSEMBLY FOR PURIFYING WATER

(76) Inventor: Ronald L. Barnes, 3122 12th Ave., Huntsville, AL (US) 35807

( * ) Notice: Subject to any disclaimer, the term of this patent is extended or adjusted under 35 U.S.C. 154(b) by 22 days.

(21) Appl. No.: 09/752,982

(22) Filed: Dec. 31, 2000

(65) Prior Publication Data

US 2001/0042708 A1 Nov. 22, 2001

Related U.S. Application Data

(63) Continuation-in-part of application No. 09/418,915, filed on Oct. 15, 1999, now Pat. No. 6,342,154.

(51) Int. Cl.$^7$ .................................................. C02F 1/78
(52) U.S. Cl. .................... 210/188; 210/192; 210/198.1; 210/232; 261/108; 261/79.2; 261/DIG. 42; 422/186.07
(58) Field of Search ............. 422/186.07; 261/DIG. 42, 261/108, 79.2, DIG. 75, 21; 210/900, 188, 198.1, 192, 760, 232; 366/336, 338, 339; 250/437

(56) References Cited

U.S. PATENT DOCUMENTS 996,561 A * 6/1911 Bradley ...................... 210/760
3,704,006 A * 11/1972 Grout et al.
4,034,965 A * 7/1977 King
4,749,527 A * 6/1988 Rasmusen
5,255,974 A * 10/1993 Signer
5,766,490 A * 6/1998 Taylor et al.
5,968,352 A * 10/1999 Ditzler
5,997,812 A * 12/1999 Burnham et al.

FOREIGN PATENT DOCUMENTS

EP         0701972 A2 *  3/1996

* cited by examiner

Primary Examiner—Joseph Drodge
Assistant Examiner—Terry K. Cecil
(74) Attorney, Agent, or Firm—Mark Clodfelter

(57) ABSTRACT

An ozone water purification system is disclosed. In this system, ozonated water flow proceeds alternately upwardly and downwardly through a series of vertical tubes. In order to disturb the laminar flow within the tubes, several types of turbulence-inducing devices may be mounted within the tubes. Such a mounting may be made so that the devices are removable for cleaning. In addition, the tubes may be circularly arranged so as to conserve space.

9 Claims, 3 Drawing Sheets

ASSEMBLY FOR PURIFYING WATER

CROSS REFERENCE TO RELATED APPLICATION

This application is a continuation-in-part of patent application Ser. No. 09/418,915, filed Oct. 15, 1999 now U.S. Pat. No. 6,342,154.

FIELD OF THE INVENTION

This invention relates to ozone-based water purification systems. More particularly, this invention relates to water purification systems utilizing vertical counterflow tubes wherein water flow is alternately directed up and down through the tubes. In addition, static mixers may be fitted within the tubes to generate turbulence therein.

BACKGROUND AND SUMMARY OP THE INVENTION

Commonly known ozone water purification systems comprise the elements of an ozone gas generating apparatus, a water carrying tube including an ozone contact time segment, and a bubble separating column or chamber. The ozone generating apparatus typically comprises a cylindrical chamber through which atmospheric air containing diatomic oxygen is pumped or drawn. Radiation from a lamp capable of emitting intense ultraviolet light having a wavelength of approximately 185 nanometers excites the diatomic oxygen within the chamber. As a result of such molecular excitation, a fraction of the diatomic oxygen within the chamber is split, producing free atoms of oxygen. As a result of their extremely high chemical reactivity, free oxygen atoms within the chamber rapidly react with the remaining intact oxygen, forming molecules having three atoms of oxygen. Molecules consisting of three oxygen atoms are commonly referred to as ozone, which exists naturally as a gas.

Another commonly known method of producing ozone gas within a chamber is to introduce closely spaced electrodes therein and to induce a sufficient electrical potential difference between the electrodes to produce electric discharge arcing. Diatomic oxygen molecules in close proximity with such electrical arcing similarly degrade into free oxygen atoms, which quickly react with diatomic oxygen to form ozone gas.

In commonly known configurations of ozone water purification systems, ozone-rich air emitted from the ozone generator apparatus is introduced into a stream of water in need of purification, such water typically moving through a tube. Where the air within the ozone-generating apparatus is pressurized by, for example, an air compressor, the output of the ozone generator may be introduced into the water-carrying tube by means of a simple air line interlinking the output of the ozone generator and an aperture extending through the wall of the water-carrying tube. Alternately, the air line may terminate at a venturi installed in line with the tube creating a localized venturi effect at the output end of the air line. Use of a venturi allows the kinetic energy of water within the water-carrying tube to perform work upon the air within the air line, drawing air through the ozone generator via the air line and into the stream of water.

Ozone carrying air which is either injected into the contaminated water stream or drawn into the stream by a venturi initially exists in the form of air bubbles. In order for the ozone gas to have a purifying effect upon the water, such gas must be dissolved into the water. Such dissolving of the gas into the water necessarily occurs at the spherical surface tension boundaries between the gas and the water. A high solubility differential between common air components and ozone gas causes the ozone within such air bubbles to dissolve more quickly than other gases. An exception to this occurs where an ozone residual exists in water in close proximity to the bubbles. Here, rate of infusion of ozone into the water may be reduced due to the strong negative charge of the ozone molecules. In any case, ozone carrying bubbles must remain immersed in water a sufficient length of time to achieve sufficient dissolution of ozone.

In commonly configured ozone water purification systems, the water-carrying tube serves dual functions, both transporting water containing dissolved ozone to its desired destination, and providing an elongated immersion chamber where air bubbles containing ozone may remain in contact with the water for a sufficient length of time to allow dispersion of the ozone into the water. In order for ozone dispersion to occur within the water-carrying tube, the tube must have a sufficient length, i.e., an ozone contact time length. The contact length of the tube may typically be between approximately 1–4 feet or so in length. However, the length may vary depending upon variables such as rate of flow within the tube, turbulence and water temperature. Sharp turns within the tube or turbulence-inducing baffles or screens installed within the bore of the water carrying tube may serve the function of breaking larger ozone-carrying bubbles into smaller bubbles, increasing the overall surface area of the bubbles, and increasing the rate the ozone dissolves into the water. In addition, where an ozone residual exists in water proximate the bubbles, transfer of ozone from the bubbles is inhibited. While venturi injectors or mixers such as those used in dissolving ozone into water provide a small bubble size, the flow of water just downstream the injector, within 12–15 inches or so, becomes laminar. As such, the bubbles, being entrained in a laminar flow just downstream the injector, become so closely packed together that they merge into larger bubbles. Further, the fluid moving with the bubbles in the laminar flow becomes permeated with ozone, inhibiting further transfer of ozone from the bubbles.

Where water bearing dissolved ozone gas is poured into a body of water such as, for example, a swimming pool, the ozone beneficially reacts with various contaminants. For example, ozone rapidly reacts with metal ions within the water, forming precipitants which may be removed through filtration. Ozone dissolved in water also degenerates or causes lysis of the cell walls of bacteria, killing bacteria, viruses and protozoan organisms. However, while ozone kills bacteria and viruses almost instantly, protozoa such as those that harbor the bacteria that cause Legionnaires disease require longer exposure to higher concentrations of ozone to be killed. Ozone within water also beneficially oxidizes and neutralizes sulfides, nitrates, cyanides, detergents, and pesticides. In all such cases, the efficacy of ozone in reacting with such contaminants is enhanced by reducing the physical distance between contaminant organisms or molecules and the molecules of ozone within the water. In a large volume of water, such as a drinking water storage tank, spa, or swimming pool, the concentration of dissolved ozone becomes undesirably low, slowing the rate at which the ozone reacts with contaminants. To prevent such dilution of ozone concentration, it is desirable to first introduce the ozone-carrying water into a reaction chamber having a smaller interior volume which maintains higher concentrations of ozone.

Accordingly, it is an object of the present invention to provide an ozone-based water purification system which incorporates in series an ozone generating apparatus and an ozone contact tubing segment, the contact segment configured as vertical tubes so that water flows alternately upwardly and downwardly in the tubes.

It is another object of the invention to provide such an ozone-based water purification system wherein turbulence and mixing of the flow of water and bubbles is induced in the contact tubing segment. This keeps bubble size small, and does not allow a buildup of ozone in water proximate the bubbles, allowing more ozone to dissipate into the water. In addition, this mixing and turbulence enhances killing of bacteria and viral organisms by disturbing the laminar flow within the contact tubing segment.

Other objects and benefits of the present invention will become known to those skilled in the art upon review of the detailed description which follows, and upon review of the appended drawings.

DETAILED DESCRIPTION OF THE PREFERRED EMBODIMENT

Figure 1:
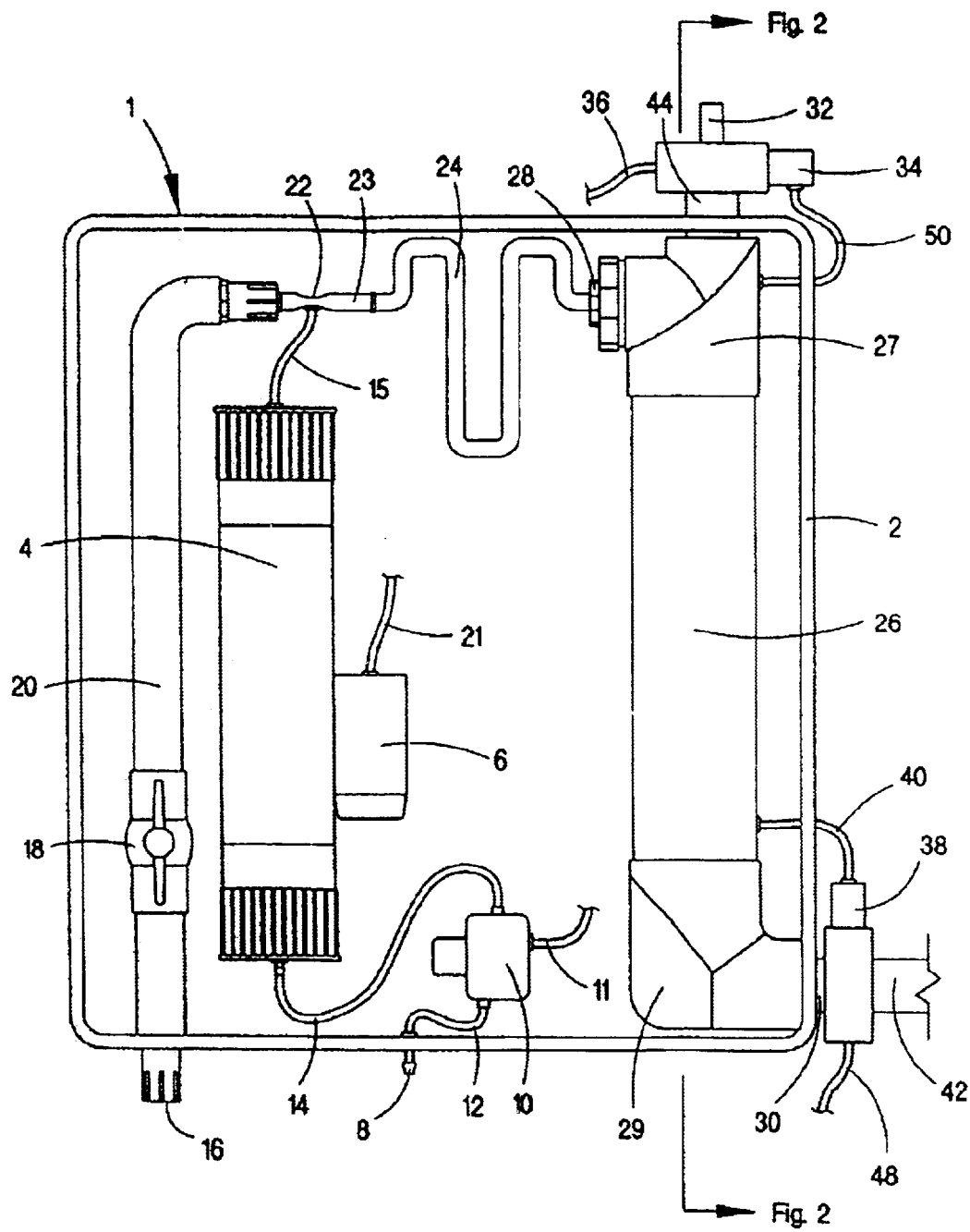
FIG. 1 is a representational diagram of the instant inventive assembly, components thereof being shown encased within a housing.

Referring now to the drawings, and in particular to FIG. 1, the instant inventive assembly for purifying water is referred to generally by reference arrow 1. The major components of the assembly 1 may be, but not necessarily, housed within a rigid casing 2. Such casing 2 conveniently compartmentalizes the assembly 1 for use in conjunction with pool plumbing systems, spa plumbing systems, drinking water systems and other similar systems.

Referring further to FIG. 1, the assembly 1 for purifying water has two fluid input ports, they being an atmospheric air input port 8 and a contaminated water input port 16. Atmospheric air may be drawn into and through the air input port 8 by an electric motor-driven air compressor 10, electrical power being supplied to the air compressor 10 via an electrical power cord 11 (Electrical circuitry and wiring of the assembly is common and is not completely shown). Compressed air from the air compressor 10 is driven through air line 14 into and through a high intensity ultraviolet light ozone gas generator 4, such ozone generator 4 having an electric ballast 6 conventionally powered via electric power cord 21. The high intensity ultra-violet light ozone generator 4 has a hollow bore through which the atmospheric air passes, the hollow bore typically having an axially mounted ultraviolet light emitting element. Exposure of diatomic oxygen within the bore of the ozone generator 4 to the ultraviolet light breaks down such molecules, producing free atomic oxygen which rapidly reacts with unbroken $O_2$ molecules to form ozone gas.

In another embodiment, a corona discharge ozone gas generator may be used in place of a high intensity ultraviolet light ozone generator. Electrical arcing within a corona discharge ozone generator similarly acts upon diatomic oxygen to form ozone gas.

Referring further to FIG. 1, air containing an enhanced concentration of ozone gas exits the output end of the ozone generator 4 to pass through an output air line 15. Simultaneously with the flow of such atmospheric air, water in need of purification is pumped into water input port 16 and thence through a water-carrying tube 20; the flow through such tube 20 being selectively terminable by a manual shut off valve 18.

In operation of the assembly 1, contaminated water carried through the water-carrying tube 20 combines with ozonated air having enhanced quantities of ozone gas at an ozone injection point 22. The ozone injection point 22 may be configured as a venturi 23, which draws ozone gas-bearing air through the ozone generator 4 and through the output air line 15. Where water is pumped through the water-carrying tube 20 at a high velocity, the venturi 23 typically has sufficient pumping power to alleviate the need for an air compressor 10. Both the air compressor 10 and configuration of the ozone gas injection point 22 as a venturi 23 may be utilized in order to assure a sufficient flow of ozone-bearing air under all conditions.

Referring further to FIG. 1, air flowing downstream from the ozone injection point 22 initially exists in the form of bubbles immersed within the contaminated water. Necessarily, the ozone gas within such bubbles is dissolved within the water in order to beneficially react with and purify water-carried pathogens and contaminants. A lengthened ozone contact time segment of tubing 24 extends downstream from the ozone gas injection point 22; such segment 24 assuring that gas bubbles containing ozone gas remain submerged within the contaminated water a length of time sufficient to allow dissolving of the ozone. Ozone contact time segment 24 may have a series of sharply angled turns creating internal water turbulence. Such water turbulence within the contact time segment 24 assists in breaking up larger bubbles into smaller ones, increasing their total surface area, thereby increasing the rate of dispersion of ozone gas. Suitably, other water turbulence inducing means such as strainers and baffles, as will be further explained, may be installed within the interior bore of the ozone contact time segment 24. The appropriate length of the contact time segment 24 varies depending upon factors such as water flow speed, volume of injected gas, and water temperature.

Referring further to FIG. 1, water emitting from the ozone contact time segment 24 typically includes contaminants, dissolved ozone gas, and submerged bubbles of other atmospheric gases. The presence of bubbles of other gases at such point results from the fact that ozone gas is generally much more soluble within water than common air components such as nitrogen, oxygen, and carbon dioxide. At the point dispersion of the ozone gas becomes substantially complete, bubbles of such other gases typically remain. The water, including contaminants, bubbles, and dissolved ozone, emits from the downstream end of the ozone contact time segment 24 to enter a water inlet port 28 of a hollow, vertically oriented bubble separator column 26. In addition, a residual of ozone gas may still exist in the bubbles, which is required by current regulations to be removed prior to directing the flow of water back to the pool, spa or other receptacle.

Figure 2:
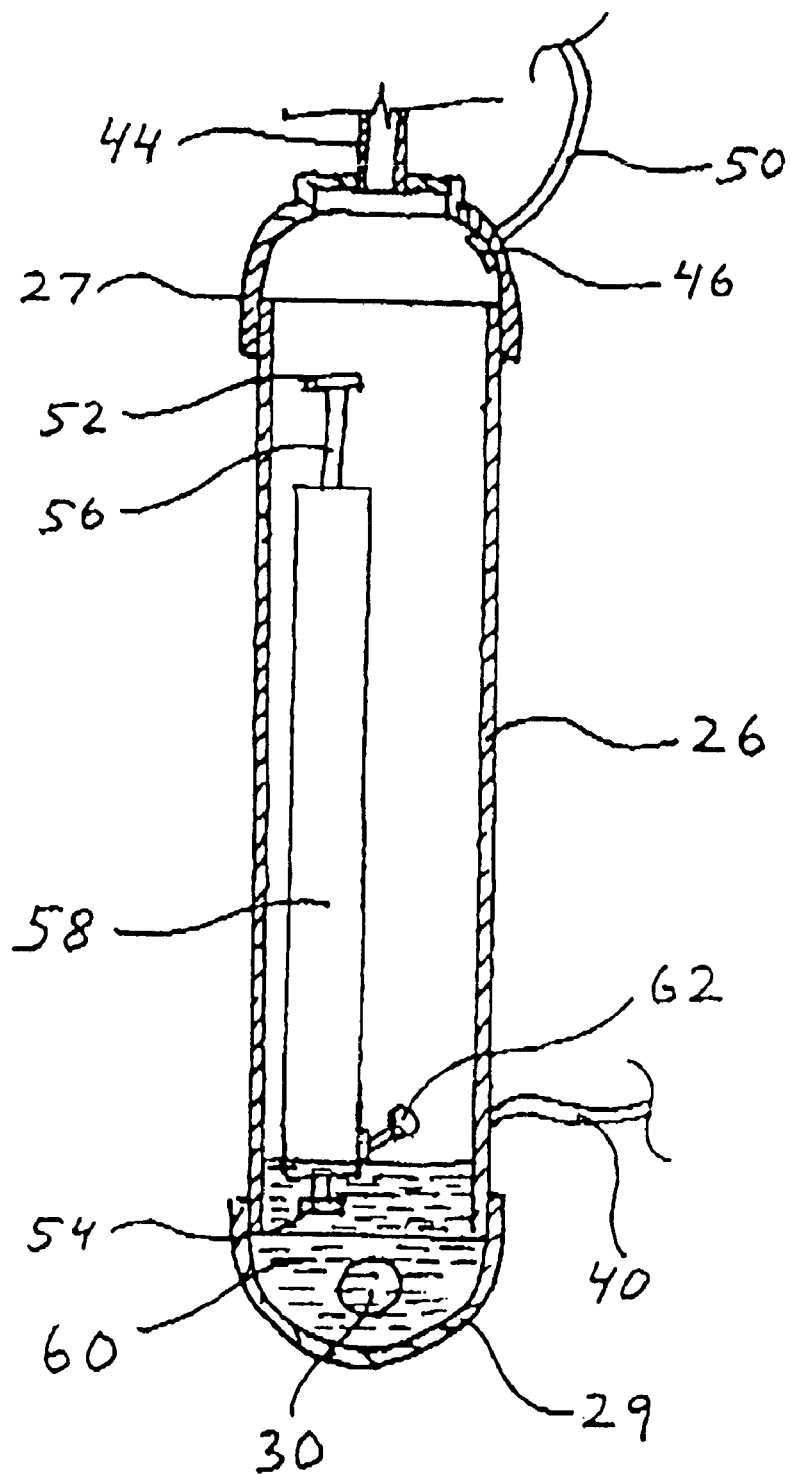
FIG. 2 is a sectional view of a component of the assembly as indicated in FIG. 1.

Referring simultaneously to FIGS. 1 and 2, the bubble separator column 26 serves the function of separating undesirable bubbles from the water. As water flows through the water inlet port 28 and thence downward through the hollow bore of the bubble separator column 26, bubbles within the water rise upward where gasses therein are emitted from the bubble separator column 26 through an off gassing vent 44. The upper and lower ends of the bubble separator column 26 are closed by upper and lower caps 27 and 29, such caps being apertured at an input port 28, the off gassing vent 44, and at an output port 30.

Referring further to FIGS. 1 and 2, the flow of fluids, gaseous and liquid, through the off gassing vent 44 is preferably controlled by a solenoid valve 34, such valve 34 receiving its power supply via a power cord 26. The solenoid valve 24 is preferably spring biased to a normally open position. In the event the water level within the bubble separator column 26 rises excessively, immersion of a water sensitive switch 46 actuates the solenoid valve 34 by closing a circuit including the valve power supply 36 and switch leads 50. Upon such actuation, the solenoid valve 34 closes the off gassing vent 44, preventing water from undesirably spilling from output tube 32. Suitably, float actuated switches may be utilized for actuation of valve 34. Also suitably, a float actuated mechanical flap valve may be utilized in place of the solenoid valve 34. Vent 44 may be coupled to tubing that carries the gasses to the outdoors, or to a device for destroying residual ozone not absorbed by the water.

It is desirable that water containing pathogens or undesirable dissolved solids contain a high concentration of dissolved ozone gas for a length of time sufficient to allow beneficial reactions between the dissolved ozone gas molecules and the contaminants. Accordingly, in the instant inventive assembly, the bubble separator column 26 further functions as an enhanced concentration chemical reaction chamber. Performance of such function is accomplished through the installation of a solenoid valve 38 which controls water flow through the lower outlet port 30 of the bubble separator column 26. The solenoid valve 38 is spring biased in a normally open position, assuring that water continues to flow out of the bubble separator column 26 upon cut off of electrical power.

Further referring simultaneously to FIGS. 1 and 2, a common toggle switch 62 has water sealed terminal leads 40 which extend through the wall of the bubble separator column, such leads 40 extending to the solenoid valve 38 and making up a part of such valve's power supply circuit. As water 60 within the interior bore of the bubble separator column 26 rises, a float 58 slidably mounted over a slide bar 56 buoyantly rises. The slide bar is preferably fixedly mounted at its upper and lower ends upon the inner wall of the bubble separator column 26 by means of upper and lower float support brackets 52 and 54. As the float 58 upwardly rises, a toggle switch 62 pivotally linked to the float 58 is tripped upwardly, breaking the electrical circuit powering the solenoid valve 38. As the water level within the bubble separator column 26 falls, the weight of the float 58 downwardly trips the toggle switch, closing such electric circuit and actuating the solenoid valve 34 to interrupt the flow of water emitting from the water outlet port 30. Preferably, the buoyancy and weight of the float 58, along with the trip pressure of the toggle switch 62 are calibrated so that the switch 62 trips upwardly only after the water level sufficiently rises, and so that the switch 62 trips downwardly only after the water level reaches a sufficiently low point.

The interaction between the float 58, the toggle switch 62, and the solenoid valve 38 produces a hysteresis effect, causing the water level within the bubble separator column 26 to cyclically rise and fall, continuously alternately collecting and discharging the water 60. Such hysteresis effect provides for beneficial chemical reactions of ozone with contaminants in a water environment including enhanced concentrations of dissolved ozone.

In yet another embodiment, a float actuated mercury switch (not drawn) may be used as a substitute for the toggle switch 62. Also suitably, upper and lower water sensing switches (not drawn) may be utilized in place of float actuated mercury or toggle switches. Also suitably, a wholly mechanical float actuated floating flap valve (not drawn) may be utilized to induce the desired cyclical collection and discharge of water within the bubble separator column 26. Numerous other suitable means for inducing cyclical collection and discharge of water within the bubble separator column 26 may be utilized.

Referring to FIG. 1, purified water emitting from output port 42 of the assembly for purifying water 1 may be routed directly to the body of purified water (e.g., a tank of drinking water, a swimming pool, a whirlpool or hot tub). Alternately, water emitting from output port 42 may be routed to a point upstream of an input port of a water pump (not drawn) which drives water into the water input port 16; such routing creating a feedback loop for enhanced water purification. Where a feedback loop is utilized, a flow divider is necessarily installed to split the flow of water between the inventive water purifying assembly 1 and the body of water to be purified.

Figure 4:
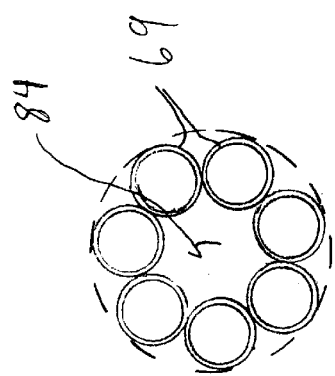
FIG. 4 is a sectional view taken along lines 4—4 of FIG. 3.
Figure 3:
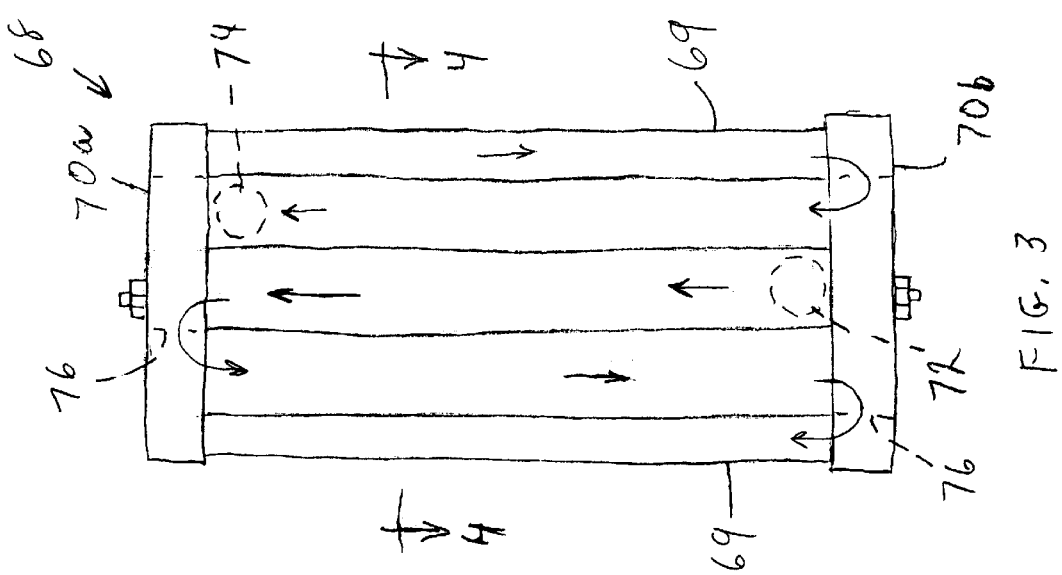
FIG. 3 is a view of a contact length segment employing vertical tubes wherein water flows alternately upwardly and downwardly through the tubes.

In another embodiment of the invention, and referring to FIG. 3, one embodiment of a counterflow and mixing apparatus 68 of the present invention is shown. In the above-described embodiment, apparatus 68 may replace the contact time segment 24. Here, a plurality of tubes 69 may be circularly arranged as shown in FIG. 4, with ends thereof capped on both ends by caps 70a and 70b. A water inlet 72 and water outlet 74 (both shown in dashed lines) are conventionally provided, as by providing those tubes 69 having the inlet and outlet therein with appropriate T fittings. At the top and bottom of adjacent tubes 69 are communicating passages or openings 76 for allowing water to flow through respective adjacent tubes. As such, with the water inlet located at a bottom of apparatus 68, water flows into apparatus 68 through inlet 72, up through the tube 69 where at the top the water passes through opening 76 into the adjacent tube 69. At that point the flow of water proceeds downward in the adjacent tube 69, and upon reaching a bottom thereof it then passes through an opening 76 and proceeds upward in that tube 69. The water thus flows upwardly and downwardly through adjacent tubes around apparatus 68 until exiting at outlet 74. Openings 76 in adjacent tubes 69 may be constructed in upper and lower sides of the tubes and sealed by appropriately configured gaskets, or glued together with a caulking-type glue so as to gluably seal the interface between adjacent tubes and direct water through the adjacent openings. In another embodiment, caps 70a and 70b may be constructed having passages molded or cut therein so as to direct water flow into and from adjacent tubes 69. Alternately, each tube may be provided with threaded ends, with individual caps threadably engaging ends of the tubes. Where apparatus 68 is to be strictly used in a counterflow application, the ends of tubes 69 may simply be fitted with curved 180 degree fittings so as to direct flow of water as described above. In a typical application for a hot tub, spa, jetted tub or similar bathing receptacle, the tubes 69 may be 12–18 inches or so in length and number of tubes selected such that the contact length may be from about 4–8 feet or so in length. Diameter of these tubes may be from about ¾ to 1 inch or so. For a larger volume of water, such as a swimming pool, diameter of the tubes may be increased to match the diameter of tubing used in plumbing of the pool.

Figure 6:
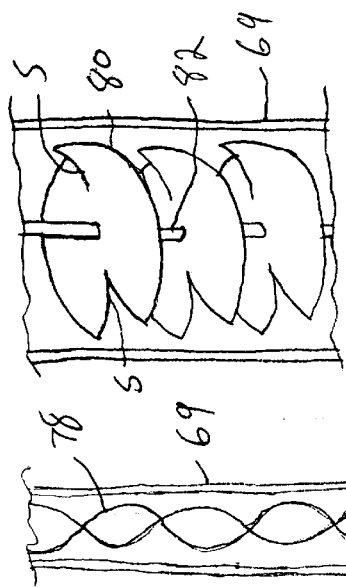
FIG. 6 is a view of a different static mixer in a single contact tube.
Figure 5:
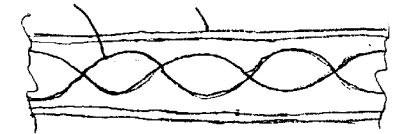
FIG. 5 is a cut-away view of a single contact tube having a static mixer disposed therein.

In order to overcome the problems related to static flow, Applicant proposes that static mixers be placed within tubes 69 to break up the laminar flow therein. Accordingly, and referring to FIG. 5, a static mixer 78 is constructed in the form of a twisted, elongated sheet of material, such as a metal or plastic, which when mounted within a tube 69, causes water flow therein to become turbulent. FIG. 6 shows plurality of static mixers 80 mounted to a rod 82, with each static mixer constructed as a disk having two radial, opposed slits S, with the material on opposite sides of the slit bent vertically in opposite directions. Alternately, fixed propeller-like structures or any structure that breaks up the laminar flow may be used. These static mixers effectively break up larger bubbles into smaller bubbles and insure that the fluid around the bubbles is maintained in a mixed condition so that ozone within the bubbles is allowed to dissipate within the water. The static mixers may be positioned throughout the length of the tube they are fitted in, or may be fitted in the upper ends and/or lower ends of the tubes.

Figure 7:
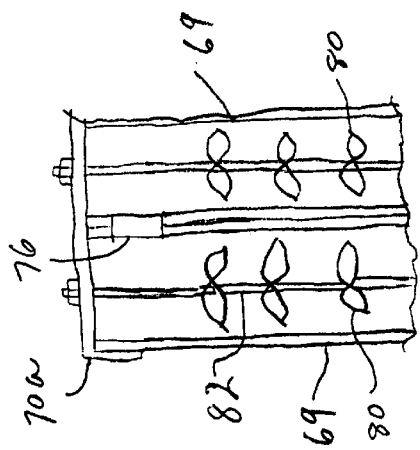
FIG. 7 is a view showing construction details of a static mixer arrangement adapted for relatively convenient cleaning.

With static mixers constructed within tubes 69 as described, another problem arises when the static mixers become clogged or dirty. In order to overcome this problem, Applicant proposes to mount the rods 82 (or other members holding the mixers) to one of caps 70a, 70b as shown in FIG. 7. With this construction, the rods and static mixers may be removed as a single unit when the cap having the rods mounted thereto is removed, thus easily facilitating cleaning of the static mixers. Where each tube is individually capped, each cap is fitted with a rod 82 mounted thereto.

The reactions of ozone in contaminated water depend on concentration of ozone in the water. Here, in turbulent water just downstream an injector where ozone is drawn into the water, bacteria are killed rapidly. More resistant organisms, such as protozoa, require comparatively prolonged exposure at a higher concentration of ozone in order to kill them. Typically, such sanitization against protozoan organisms is accomplished in packed column systems where an array of diffusers are positioned at the bottom of a tank, with ozone fed to the diffusers so that the ozone bubbles up through water in the tank. As such, Applicant's system may simulate a packed column system by fitting approximately half or so of the tubes 69 with static mixers, with the remaining tubes 69 not containing the mixers, allowing free flow of water therethrough. Such an assembly 68 may be provided in place of contact length 24 (FIG. 1) so that just downstream from injector 23 the first 3 or 4 of tubes 69 contain static mixers to violently mix the water, rapidly killing any bacterial and viral organisms, with the remaining tubes 69 not containing any mixers serving as counterflow tubes. Here, with apparatus 68 oriented vertically, water would freely and comparatively smoothly flow up one tube and down the next (these tubes not containing mixers), allowing a residual of ozone to accumulate in the same manner as a packed column system, thus killing protozoan organisms. Additionally, where water flows downward in tubes 69, the water flow is more turbulent, causing more buoyant, larger bubbles previously formed to be broken up. In another embodiment, the counterflow tubes 69 without the mixers may be oriented just after the venturi injector 23, with tubes 69 containing the static mixers positioned thereafter in the water flow. Alternately, a linear counterflow array may be provided wherein tubes 69 are not circularly arranged, but are inline.

Here, some or all of the tubes 69 may be provided with static mixers, with top or bottom (or both) ends of these tubes provided with threads to which individual threaded caps are engaged, the mixers being in turn attached to the cap generally as shown in FIG. 7.

Other embodiments include a counterflow system of longer or shorter length than that disclosed, and which may be in other configurations other than circularly arranged. For instance, 4 counterflow tubes may be arrayed in a parallelogram or square arrangement, and may or may not be fitted with static mixers. Other enhancements may include constructing the counterflow tubes and end parts of a transparent material, and provide lighting such as that described in Applicant's copending application filed Nov. 20, 2000 wherein ultraviolet light from the ozone generator is directed onto phosphors that in turn radiate in the visible spectrum. Here, ozone gas generator 4 (FIG. 1) may be constructed having transparent outer walls containing or coated with phosphor and positioned within the hollow region 84 (FIG. 4) so that the entire apparatus 68 (FIG. 3) is illuminated from within. Additionally, this would conserve space and generally provide cooling of the ozone gas generator 4. Further, in a circular embodiment as described with the ozone generator centered therein, and where ultraviolet-transmissive materials are used in walls of the ozone generator and water-carrying tubes and not coated with phosphor compounds, ultraviolet light from the ozone generator radiates into the water flow tubes, greatly assisting in killing any microbiota in the water. In addition, ultraviolet radiation used in ozone generators contains radiation at the 254 wavelength, which is known to disassociate ozone and release free atomic oxygen. As such, with the ozone generator and water-carrying tubes constructed of an ultraviolet transparent material as described, such as quartz, and with the ozone generator located within hollow region 84, reaction times are increased due to ozone in the water being disassociated into free atomic oxygen.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims, wherein I claim:

1. A water sanitizing system for a spa, hot tub or other bathing facility comprising:

a plurality of vertical tubes, each tube of said plurality of vertical tubes being serially connected so that a flow of water is serial through said system and alternates in upward and downward directions a plurality of times, said plurality of vertical tubes being circularly arranged about an axis parallel to axes of said vertical tubes, defining a hollow region surrounded by said vertical tubes, an ozone generator located in said hollow region, a mixing device coupled to said ozone generator via a gas flow line to provide ozone from said ozone generator to said flow of water at an ozone injection point, turbulence-inducing devices disposed within at least some of said tubes, a bubble separator in a last tube of said tubes with respect to said flow of water, for removing bubbles from said flow of water.

2. A water sanitizing system as set forth in claim 1 wherein said turbulence inducing devices are configured as static mixers.

3. A water sanitizing system as set forth in claim 1 wherein adjacent, sealed openings at upper and lower regions of said vertical tubes allow water to flow alternately upward and downward through said vertical tubes.

4. A water sanitizing system as set forth in claim 1 wherein at least one end of said vertical tubes containing said turbulence-inducing devices comprises an end cap, with said turbulence-inducing devices coupled to said end cap.

5. A water sanitizing system as set forth in claim 4 wherein said end cap is removable for cleaning said turbulence-inducing devices.

6. A water sanitizing system as set forth in claim 5 wherein said end cap comprises a single unitary end cap enclosing ends of said vertical tubes.

7. A water sanitizing system as set forth in claim 6 wherein said unitary end cap is provided at opposed ends of said vertical tubes, with each said end cap positioned to allow water to flow alternately upward and downward through said vertical tubes.

8. A water sanitizing system comprising:

an ozone generator, a mixing device coupled to said ozone generator via a gas flow line to provide ozone from said ozone generator to a flow of water at an ozone injection point, a series of vertical tubes circularly arranged about an axis parallel to axes of said vertical tubes defining a hollow region surrounded by said vertical tubes, said vertical tubes coupled so that said flow of water therethrough is alternately upward and downward, and said series of vertical tubes receiving said flow of water with bubbles containing ozone therein, said ozone generator disposed in said hollow region, turbulence-inducing devices disposed within said vertical tubes, and a bubble separator for receiving said flow of water from said vertical tubes, for removing gasses from said flow of water.

9. A water sanitizing system as set forth in claim 8 further comprising adjacent, sealed openings at upper and lower regions of said vertical tubes, said openings allowing water to flow alternately upward and downward through said vertical tubes.

* * * * *